P. E. EDELMAN.
ELECTROCHEMICAL ANALYTICAL CONTROL.
APPLICATION FILED AUG. 19, 1912.
1,341,790.
Patented June 1, 1920.
3 SHEETS—SHEET 1.
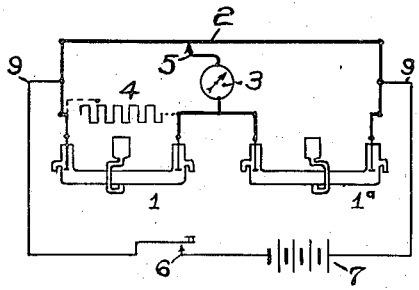
FIG. 1.
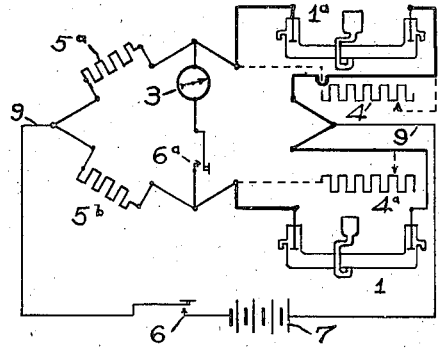
FIG. 2.
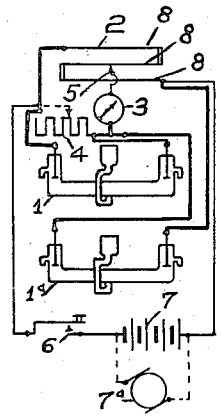
FIG. 3.
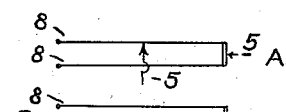
FIG. 4.
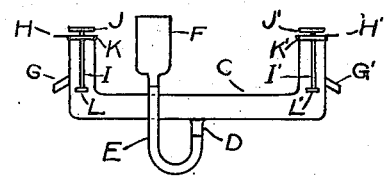
FIG. 5.
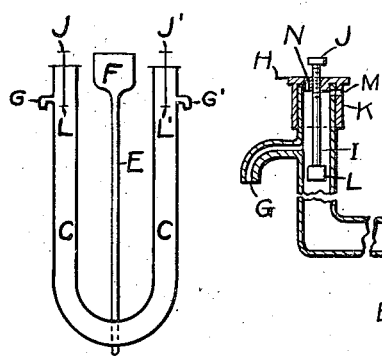
FIG. 7.
FIG. 8.
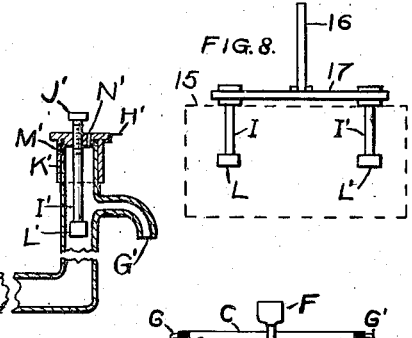
FIG. 10.
FIG. 6.
FIG. 9.
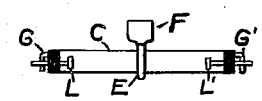
WITNESSES
Rose Edelman
M. I. Edelman
INVENTOR.
Philip E. Edelman.

P. E. EDELMAN.
ELECTROCHEMICAL ANALYTICAL CONTROL.
APPLICATION FILED AUG. 19, 1912.

1,341,790.

Patented June 1, 1920.
3 SHEETS—SHEET 2.

WITNESSES
M. J. Edelman
Rose Edelman

INVENTOR.
Philip E. Edelman.

UNITED STATES PATENT OFFICE.

PHILIP E. EDELMAN, OF MINNEAPOLIS, MINNESOTA.

ELECTROCHEMICAL ANALYTICAL CONTROL.

1,341,790.   Specification of Letters Patent.   Patented June 1, 1920.

Application filed August 19, 1912. Serial No. 715,849.

*To all whom it may concern:*

Be it known that I, PHILIP E. EDELMAN, a citizen of the United States, residing at Minneapolis, in the county of Hennepin and State of Minnesota, have invented a new and useful Method of and Apparatus for Electrochemical Analytical Control, of which the following is a specification.

My invention relates to improvements in methods and means for electrochemical analysis, and it consists in the steps hereinafter set forth, and in the apparatus for carrying out these steps.

An object of my invention is to provide a simplified method of analysis which can be carried out by unskilled, as well as skilled, persons, and by which the quality, strength, or relative composition of solutions, chemical compounds, etc., may be readily determined.

A further object of my invention is to provide a method or process for standardizing the product of a chemical process by controlling the quantity of the materials used.

A further object of my invention is to provide means for automatically producing a constant mixture of variable ingredients.

A further object of my invention is to provide apparatus for carrying out the above-named objects.

Other objects and advantages will appear in the following specification, and the novel features of the invention will be particularly pointed out in the appended claims.

My invention is illustrated in the accompanying drawings, forming part of this application, in which—

Figures 1, 2 and 3 are diagrammatic views showing different embodiments of my invention;

Fig. 4 is a detailed view of a slide-wire bridge;

Fig. 5 is a detailed view showing an auxiliary circuit which may be controlled by the current indicator shown in Fig. 3;

Fig. 6 is a detailed view of certain parts shown in Figs. 1, 2 and 3;

Figure 11:
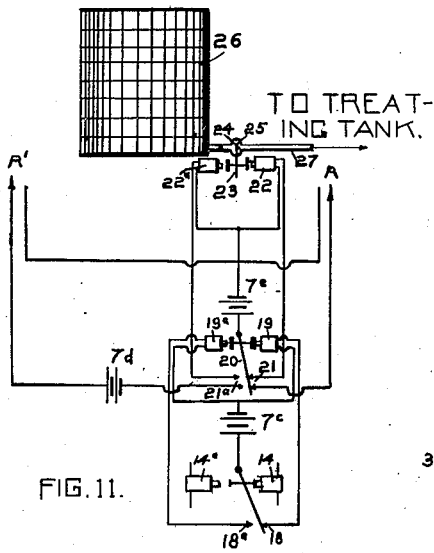
Figure 12:
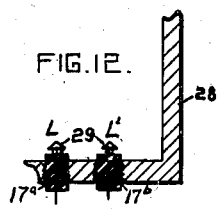
Figure 14:
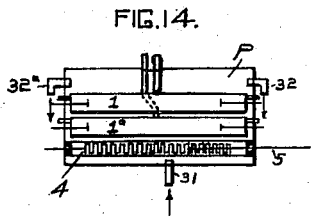
Figure 13:
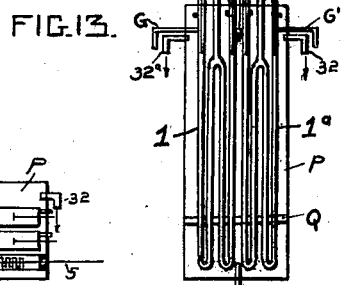

Figs. 7 to 10 inclusive are detailed views of modified forms of portions of the apparatus;

Fig. 11 is a diagrammatic view showing the use of the mechanism shown in Fig. 5;

Fig. 12 is a detailed view of a portion of a modification of Fig. 8;

Fig. 13 is a view showing means for maintaining the apparatus at a desired temperature; and Fig. 14 is a view of a modified form of means for maintaining the apparatus at a desired temperature.

Figure 15:
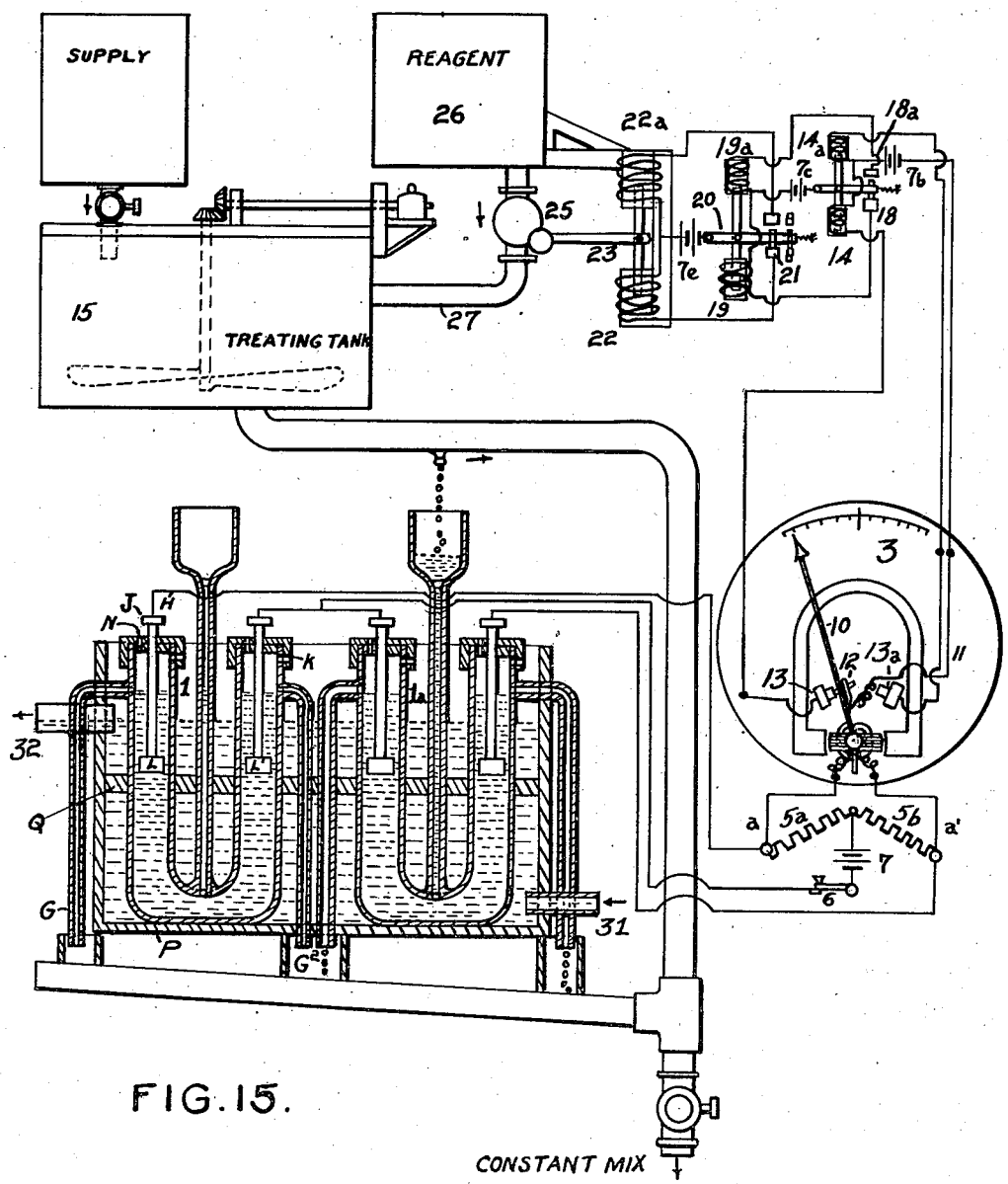

Fig. 15 is an assembled view of a suitable embodiment of the apparatus by way of example illustrating the use thereof.

My invention comprises broadly the comparison of a liquid or solution of unknown composition or quality with one of known or standardized composition, or its equivalent, by means of electrical circuits having suitable indicators, variable resistances, current supply and current control.

As an instance of the application of my invention I may mention the preparation of bi-sulfite of lime. Milk of lime is prepared in the usual manner and sulfur dioxid is passed into the milk of lime which is contained in a suitable receptacle. Bi-sulfite of lime results and it is necessary for best results to have the correct amount of sulfur dioxid, otherwise there will be an excess of milk of lime which may cause a clogging like boiler scale. For the right amount of sulfur dioxid the liquid should be slightly acid and contain substantially no uncombined lime. If there is a variation of the supply of sulfur dioxid or of milk of lime, the conductivity of the mixture will vary, and this variation opera..·s controlling devices which may increase the amount of sulfur dioxid in the manner clearly set forth hereinafter.

Referring particularly to Figs. 1, 2 and 3, I have shown therein a suitable tube 1 for the standard solution, and a similar tube 1ª for the solution to be tested. A slide wire bridge 2 is provided, and associated with it is a galvanometer or current indicator 3. A calibrated variable resistance 4 is arranged in the circuit in such a manner that it may be substituted for the solution tube 1 when desired. The sliding contact of the bridge 2 is indicated at 5. A circuit closure or switch 6 is adapted to control the curren from a battery 7 (or from the generator 7ª) or any other suitable source of current. Since both of the arms 1 and 1ª are similarly affected by the current, it does not matter, to any noticeable extent, whether the source of current varies, or is of high or low voltage. The battery circuit terminals are indicated in Figs. 1 and 2 at 9, but are omitted from Fig. 3 for the sake of clearness.

In Fig. 1, the ratio of the unknown liquid in the tube 1ª to the known liquid in the tube 1 is obtained by moving the sliding contact 5 along the calibrated slide-wire 2 until the circuits are balanced. When a balance occurs then the resistance of the standard solution in the tube 1 is to that in the tube 1ª as the portion of the slide 2 to the left of the contact 5 is to the portion on the right of the contact. The resistance of a solution will many times vary in proportion to its density or to the quantity of matter dissolved therein. By employing a standard solution, one can see at once by glancing at the scale 2 the relative composition of the two solutions.

When the circuits are balanced there is no movement of the indicator 3. I make use of this to indicate any variations in a constantly flowing stream of a solution of unknown composition. The slidable contact 5 may be set at the point desired or at the point at which a balance is obtained and any variation in the liquid of unknown composition will be indicated by the indicator 3. The importance of this feature is considerable. Use of it is made in testing treated water in water purification. Any decided variations can be utilized to control the treatment of the water in accordance with the changes. This may be done manually or automatically, as explained hereinafter.

In Fig. 2 I have provided a current closing the key 6ª, by means of which the current may be cut off from the galvanometer. In this figure the resistances 4 and 4ª are preferably non-inductive. In Fig. 3, I have shown a novel form of slide-wire bridge in which the bridge is condensed into a plurality of lengths 8, the object being to secure portability for the apparatus without sacrificing the accuracy possible with a long wire for the bridge. In Fig. 4 I have shown modified forms of this bridge wire.

In Fig. 5, a form of the indicator 3 is shown which has terminals aa', adapted to be connected with the bridge circuit, and a separate circuit through the pointer 10, contact 12, right contact 13ª, and left contact 13, through suitable relays 14 and 14ª and current supply 7ᵇ. It is evident that when the unknown liquid has less resistance than the known liquid, or its equivalent, the indicating pointer will swing the contact 12 to one contact as 13ª, and that if it is of greater resistance the contact 12 will swing to the other contact point 13. In either case, one of the relays 14 or 14ª is operated, and this, in turn, may control other mechanism as hereinafter set forth. In Fig. 6, I have illustrated how the tubes 1 and 1ª may be constructed to good advantage. In this figure, C indicates a tube, preferably of glass and formed in the shape shown. A projection D is provided with an opening communicating with a flexible tube E having a funnel F. Adjustable electrodes L and L' are suitably mounted in the tube C by means of supports I, I', provided with thumb flanges J, J'. The supports I and I' are held by caps K, K', having vents N, N'. The supports I and I' are threaded to permit their adjustment. Discharge openings G, G', are provided. In this form of the device the liquid or solution is poured into the tube by means of the funnel F. The liquid then fills the body of the tube C and overflows at G and G'. Any products of electrolysis or other deposits which might possibly result from previous use, are thus washed away. Vents N, N', as well as vents M, M', in the caps K, K', serve to prevent any possible siphoning action on the part of the discharge spouts G, G'. They also serve to allow the escape of any possible gas which may result from electrolysis. The liquid or solution to be tested finds a level in the body portion C and the tube E, the electrodes L, L', being covered by the same. The operation may be then carried out in the manner already outlined. To clean the apparatus for new tests, the funnel F can be brought to the position indicated by dotted lines, at which position the solution previously tested will run out. The tube can then be cleaned and refilled with a new solution to be tested.

In place of the tubes 1 and 1ª, I may substitute suitable electrodes such as illustrated in Fig. 8. These are suitably mounted and adapted to be inserted in an ordinary container such as a barrel or a pot. The electrodes L and L' are carried by the supports I, I' at a fixed distance and are mounted on a suitable flange 17 having a handle 16. The containing vessel is shown at 15.

In Fig. 9, I have shown another modified form of the tube in which the body C is straight. The electrodes L, L' are arranged below the discharge openings G, G'.

In Fig. 10, the tube C is shown of a U-shaped form, the electrodes, funnel, spouts, etc., being designated by the same characters as in the other views.

In Fig. 11 I have illustrated suitable means for controlling a supply as applied to the treatment of water. Relay magnets 14 and 14ª, operated essentially the same as shown in Fig. 5, control circuits through 18, 18ª. The diagram shows the contact closed at 18. This energizes magnet 19 from the battery 7ᶜ, and bridges the double contacts at 21 through the armature 20. One of the contacts 21 may be used to operate a recorder (not shown) over the circuit R. The other contact permits the energization of the magnet 22 from the battery 7ᵉ. The armature of the magnet 22 is attached to a lever 23 connected to the diaphragm 24 of a valve or cock 25 which governs the flow from a reagent tank 26 to the treating tanks, such as that shown in Fig. 8. It is obvious that the apparatus may be adjusted so that more or less of the reagent will flow to the treating tank according as more or less is required to keep the treated water at a desired standard. Should the supply remain of a constant composition, neither of the contacts 18 or 18ᵃ would be closed and consequently the reagent flow would be unaltered.

In Fig. 12 I have shown how electrodes may be used to determine the condition of the interior of a boiler. In the figure, 28 represents a part of a boiler or tube into which two electrodes L and L' are screwed by means of insulated bushings 17ᵃ and 17ᵇ. As precipitation, either natural or that caused by chemical reagents, results, the change of the resistance will cause the fact to be indicated. In case of a scale forming about the contacts L and L', the apparatus will at once indicate the fact and serve to tell the operating engineer when to blow off or use a mechanical scale remover.

In Fig. 13, I have shown means for maintaining a desired temperature. The tubes 1 and 1ᵃ in this case are made long to make them sensitive when good conductors, such as acids, are tested, and are suitably mounted in a common container P provided with inlet 31 and outlets 32 and 32ᵃ. The inlet 31 is preferably located between the tubes 1 and 1ᵃ and the outlets provided at each end as shown, in order to insure a uniform supply of the foreign thermic agent. This may be water, cooled or heated as the case may require, steam if necessary, gases or air, and it should be noted that the thermic agent does not touch or contaminate the material tested or the standard material. If gases such as ammonia are used for cooling the tubes 1 and 1ᵃ, the latter may be sealed in the container P to avoid contamination. The overflow outlets, G, G¹, G² may be allowed to discharge into the same waste pipes as the outlets 31 and 31ᵃ, if desired. Q indicates a support for the tubes, and may be of any suitable material such as wood protected with acid-resisting water proof paint.

In the modification shown in Fig. 14, the resistance 4 is also placed under the influence of the common thermic agent, all members 1, 1ᵃ and 4 being protected from contamination with such agent. The agents used and the operation in any case are similar to those already fully described. The contact 5, in the form of a rod, projects through the container P and may be moved in or out to adjust the amount of resistance in circuit.

In Fig. 15 there is assembled the several parts hereinbefore described as an example of one suitable mode of operation. The illustration shows how a constant result can be attained from any variable supply with the means set forth.

It will be obvious that the present invention may be used in the preparation of standard solutions, reagents, medicines, lotions, mixtures and compositions, as well as for the detection and correction of variations from a desired standard of these and many other products.

What I claim is—

1. An apparatus for automatically producing a constant mixture of variable ingredients comprising, in combination, a container for one of said ingredients, means for supplying another of said ingredients to said container, an electrically operated valve for controlling said supplying means, a source of electric energy for operating said valve, a second source of substantially constant electric energy, an electric circuit from said last-named source including a portion of the material in said container, whereby the current in said circuit varies proportionately to the conductivity of the material, means in said circuit operated and controlled by said current, and means controlled by said last-named means for controlling the circuit to said valve.

2. An apparatus of the character described comprising, in combination, a container for material to be treated, variable treating means for said material, a source of electric energy, an electric circuit from said source including a Wheatstone bridge, one of the resistance arms of said bridge including a portion of the material in said container, and means for interposing an additional variable resistance in said arm.

3. An apparatus of the character described comprising, in combination, a container for the material to be treated, variable treating means for said material, a source of electric energy, an electric circuit from said source including a Wheatstone bridge, one of the resistance arms of said bridge including a portion of the material in said container, and means automatically controlled from said bridge for controlling said treating means.

4. The method of treating a material of variable requirements in order to obtain a constant resulting product which consists in passing a current of electricity through said material and varying the treatment of said material in accordance with the conductivity thereof.

5. The method of treating a material of variable requirements in order to obtain a constant resulting product which consists in passing a current of electricity from a source of constant electric energy through said material and utilizing the variations in the flow of said current to effect the automatic treatment of said material in accordance with the requirements.

6. An apparatus for controlling the impurities in a liquid or the like which comprises electric circuits of which the liquid or the like is a part and in which the currents are varied by variations in the impurities in the liquid, and means actuated by the current variations for regulating the impurities.

7. The process of controlling the composition of a liquid which consists in passing a current of electricity through the liquid and utilizing the variations in the current, caused by variations in the composition of the liquid for effecting a compensating treatment of the liquid.

8. The process of controlling the composition of a liquid which consists in causing a variation in an electric circuit in accordance with the variations of the composition of the liquid and subsequently causing compensating ingredients to be added to the liquid by the variations in the electric circuit.

9. The process of controlling the composition of a substance which consists in automatically regulating the components thereof in accordance with the changes in the electrical conductivity of said substance.

10. An apparatus for controlling the composition of a substance comprising means for passing a current of electricity through the substance and means actuated by the variations of current that are produced by variations of the composition of the substance for regulating the components thereof.

11. Apparatus for the purpose described comprising two substantially identical containers having similar electrodes and openings, one container carrying a standard portion of material, the other carrying a test portion of material, and the material in both containers forming part of an electric circuit.

12. Means for including solutions or the like in divided electrical circuits comprising a plurality of substantially identical containers having similar electrodes and openings and means independent of the natural temperature of any one of said containers for controlling the temperature of all of the containers.

13. Apparatus for including solutions in a balanced electrical circuit comprising a suitable electrode set adapted to be inserted in said circuit and an associated resistance member which represents the electrical resistance of a standard chemical material, the whole being compensated for variations in temperatures.

14. In a device of the type described, a material container, means for varying the composition of the material to form a product and means controlled by the condition of the product for maintaining the uniformity thereof.

15. The herein described method which consists in mixing materials to form a product, and in controlling the uniformity of the product through the tendencies of the latter to vary.

16. Apparatus for the purposes set forth which includes a plurality of identical solution containers compensated for polarization and temperature, and an electrical circuit associated therewith and containing a resistance member made in the form of a grid consisting of a plurality of accessible resistance portions having homogeneous conducting terminals in intimate contact therewith at uniform intervals, whereby the electrical balance between said solution containers may be quickly adjusted.

17. In apparatus of the character set forth, means for automatically regulating the components of a process in accordance with variations in the electrical conductivity of the product thereof.

18. A method for controlling a product which consists in utilizing electrical variations therein to operate electrical means which in turn control the components of the said product.

19. As a method of testing, the treating of a test portion of a material with a reagent, the maintenance of a desired temperature therein by means of an external independent thermic agent, and the comparison of the conductivity of the resulting products.

20. A method for the purposes set forth which consists in treating a chemical material, including a portion thereof in an electrical circuit, subjecting said portion to the influence of a separate external thermic agent, and causing said portion to affect said circuit in accordance with the purity of said chemical material.

21. The method of analysis which comprises dividing a substance into a plurality of containers surrounded by a common external thermic agent insulated from electrical contact with said substance, treating the divided portions, and including the treated portions in an electrical circuit which is not affected by the temperature or ionization of said portions unless the chemical composition of at least one of said portions varies from a desired standard.

22. Apparatus for the purposes set forth comprising a reagent control and operative means therefor regulated by fluctuations in an electrical circuit.

23. The system which comprises the placing of a chemical substance in relation with electrodes, the balancing of the electrical characteristics of said substance against a resistance member which has been made equivalent to a standard portion of said chemical substance, and the connection of suitable electrical circuits therewith to operate when said balance is no longer maintained to automatically restore said balance.

24. Apparatus for the purposes set forth comprising a container, two identically constructed test portion containers therein and closed therefrom, means for maintaining a fluid in each of said containers separately, an electrical circuit associated therewith, and means for controlling the supply of said fluid in said electrical circuit which function only when the chemical nature of the fluid within one of said test portion containers differs from that in the other.

25. As a testing machine, means to treat a plurality of test portions, a jacket about said test portions whereby a thermic agent external to and separated from said test portions may bring all of said test portions to the same temperature contemporaneously, and an electric circuit embracing said test portions.

26. Apparatus for the purposes set forth comprising electrodes which are capable of being inserted in a chemical supply, a compensated standard associated therewith for direct comparison, and an electrical circuit in relation therewith and containing a current consuming device which functions only when the chemical nature of said supply differs from that represented by said standard.

27. Apparatus for the purpose set forth comprising standard and test portions, auxiliary resistances which may be substituted for said portions, external insulated means for controlling the temperature thereof, and indicating and control devices connected thereto and operated only by fluctuations in the chemical nature of one of said portions which is under test, whereby the supply from which said test portion is taken may be controlled.

28. Apparatus for the purposes set forth comprising electrical controlling means operated by a circuit including a portion of the matter to be controlled.

29. Apparatus for chemical testing comprising a primary divided circuit including a portion of the substance under test, a standard metallic resistance member representing a standard portion of a standard strength of the substance under test connected in said circuit, electrical means connected therewith which function in accordance with fluctuations in the portion under test which are caused by the chemical composition thereof, and an amplifier associated with said electrical means, said amplifier operating means to control additional units of the substance under test.

30. Apparatus for the purposes set forth comprising an electrical circuit adapted to include desired portions of matter, indicating means, and means electrically connected to said portions and operated by fluctuations in the conductivity of one thereof to automatically control the said matter.

31. The method for the purposes set forth which consists in placing a substance in electrical relation with a resistance representing a standard substance and comparing the resistances of the two, the whole being under the control of a common and independent thermic agent.

32. Apparatus of the class specified comprising means for including uniform portions of solutions in a divided circuit, a compensated resistance member equivalent to a standard portion, and a balancing member comprising a resistance element provided with a plurality of conducting supports any of which supports may be connected to said circuit.

33. Apparatus for the purposes set forth consisting of a plurality of interchangeable containers having similar electrodes and a common jacket through which a thermic agent may be circulated, and an electrical circuit in relation therewith.

34. Means for introducing a liquid as a part of an electrical circuit comprising a conduction tube having flexible filling and emptying means, adjustable electrodes, and means for preventing deposits.

35. Apparatus for introducing a solution as a part of an electrical circuit comprising a conduction tube provided with a combined filling and emptying means, suitable electrodes, and vents.

36. Apparatus for the purposes set forth comprising electrodes, a combined means for both introducing and withdrawing test portions, and a thermic control therefor.

37. Apparatus for the purposes set forth comprising a plurality of electrodes, auxiliary means for maintaining a uniform test portion therebetween, an external thermic bath for said test portion adjustable to any temperature regardless of the natural temperature of said test portion, and electrical circuits in relation to said electrodes.

38. Apparatus for the purposes set forth comprising means to include test portions in an electrical circuit, means insulated therefrom to control the temperature thereof, primary means operated by the said circuit, and amplifying means in relation therewith.

39. A method for the purposes set forth which comprises maintaining a chemical supply in a desired relation with a standard under compensated conditions and causing variations in the conductivity of the said supply to operate controlling means therefor.

40. The system for the purposes set forth which consists in supplying an electrical current through a plurality of closed solution tubes which are subject to the common thermic influence of an electrically insulated thermic agent, and utilizing the said current to operate a relay device.

41. A method of testing which consists in placing a standard solution portion in a container, placing a test portion from a supply in an exactly similar container, heating or cooling both of said containers contemporaneously, compensating for the electromotive force due to gaseous decomposition products, and determining the relative conductivity of the portions within said containers.

42. The method for the purposes set forth which consists in placing spaced electrodes into matter to form a test portion, compensating for non-chemical factors which influence the conductivity of the said portion, detecting the chemically caused conductivity, and magnifying the result thereof.

43. Apparatus of the class specified comprising a plurality of closed conduction tubes having a common thermic jacket, a primary electrical circuit including said tubes, a secondary circuit controlled by the said primary circuit, and electro-mechanical means operated by the said secondary circuit.

Signed this 14th day of August, 1912, at Minneapolis, Minn.

PHILIP E. EDELMAN.

Witnesses:
 MEYER I. EDELMAN,
 ANNETTA MARTINSON.